UNITED STATES PATENT OFFICE.

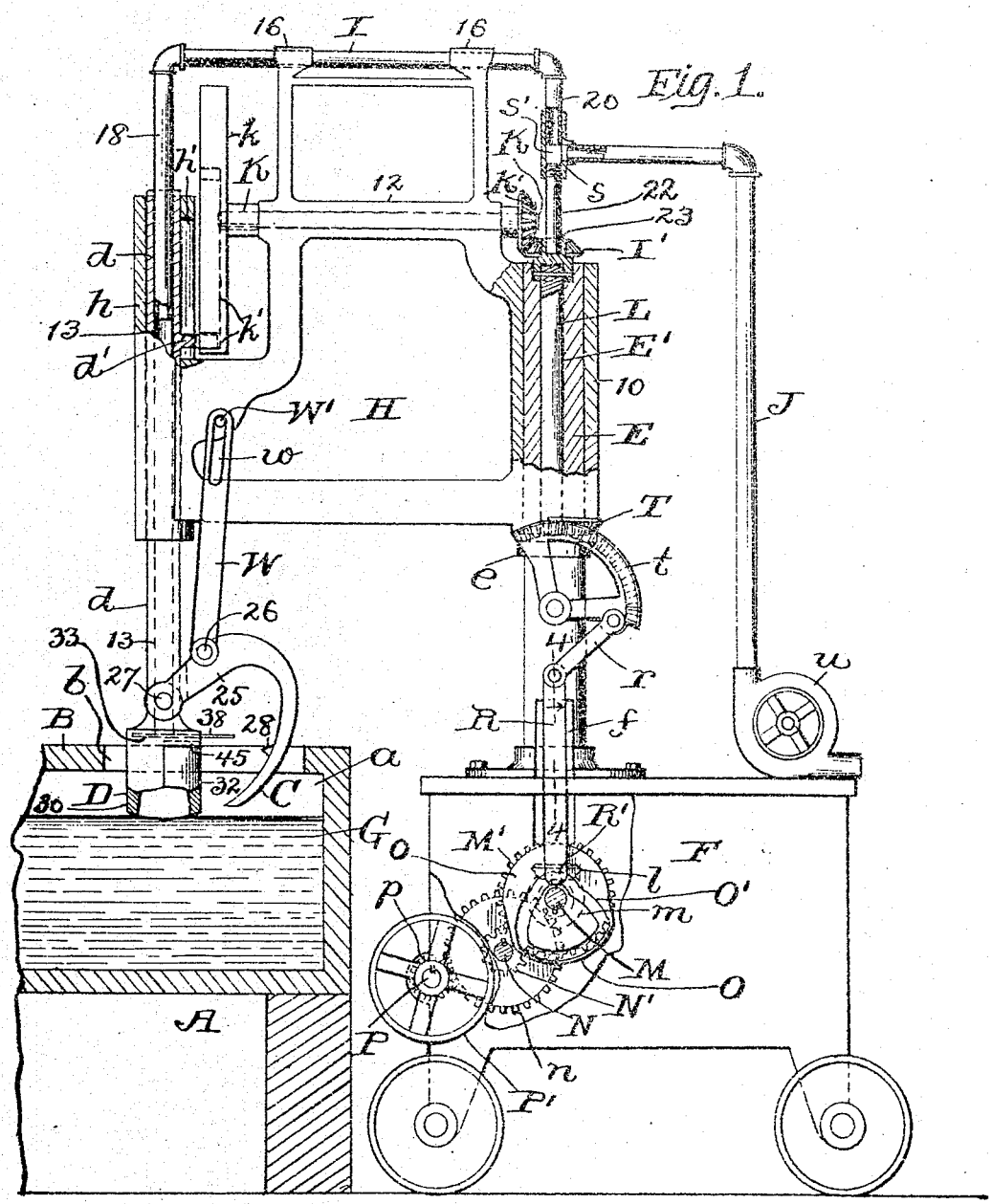

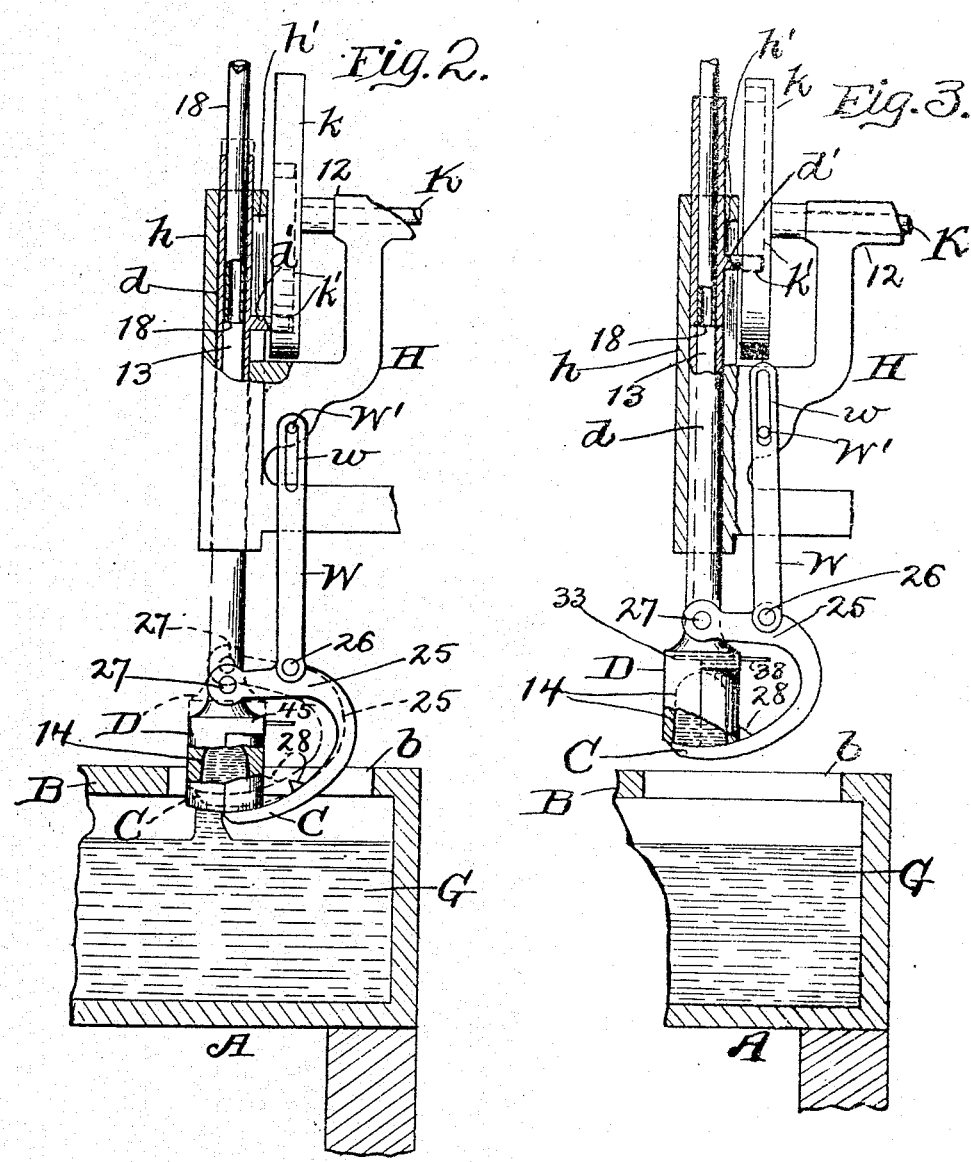

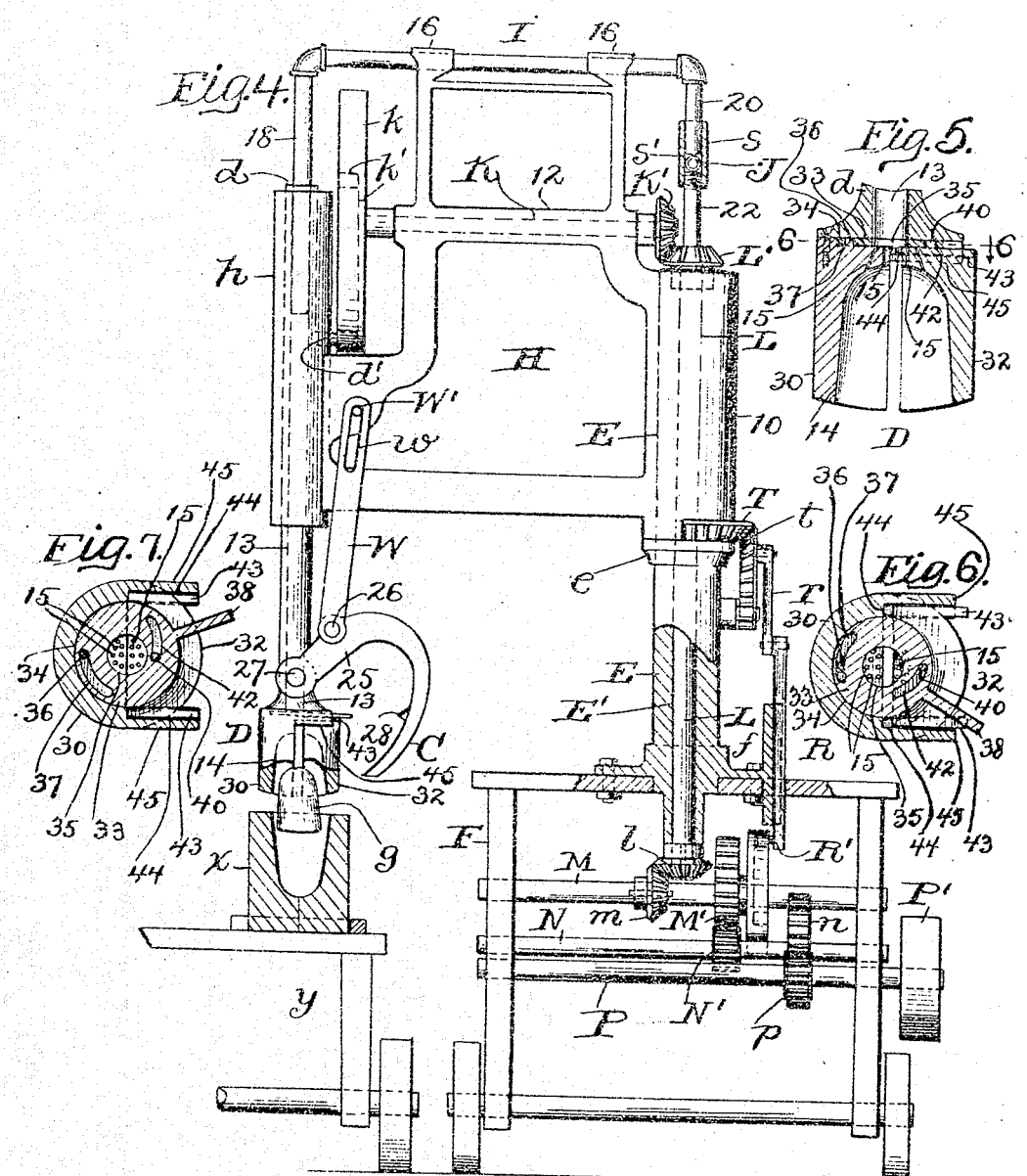

JONATHAN HALEY, OF AKRON, OHIO, ASSIGNOR TO THE AKRON GLASS AND MACHINERY COMPANY, OF AKRON, OHIO, A CORPORATION OF OHIO.

APPARATUS FOR FEEDING GLASS INTO MOLDS.

No. 800,644.     Specification of Letters Patent.     Patented Oct. 3, 1905.

Application filed November 17, 1903. Serial No. 181,466.

*To all whom it may concern:*

Be it known that I, JONATHAN HALEY, a citizen of the United States of America, residing at Akron, in the county of Summit and State of Ohio, have invented certain new and useful Improvements in Apparatus for Feeding Glass into Molds; and I hereby declare the following to be a full, clear, and exact description of the invention, such as will enable others skilled in the art to which it pertains to make and use the same.

This invention relates to improvements in apparatus for feeding molten glass or glass-metal to molds.

This invention pertains more especially to apparatus for accomplishing the following: first, sucking or drawing glass-metal from the level of a body of molten glass or glass-metal in a glass-metal-supply chamber upwardly into an inverted-cup-shaped receptacle; second, cutting off the glass-metal drawn into the said receptacle from the body of glass-metal in the said chamber; third, hoisting the charged receptacle from within the said chamber; fourth, swinging the charged and hoisted receptacle laterally to and over an open mold, and, last, uncovering the receptacle from below and discharging its contents into the said mold.

The object of this invention is to provide apparatus of the character indicated which operates with great facility, which is simple and durable in construction, and which is clean and reliable in its operation.

With this object in view and to the end of realizing other advantages hereinafter appearing this invention consists in certain features of construction and combinations of parts hereinafter described, and pointed out in the claims.

In the accompanying drawings, Figure 1 is a side elevation, largely in section, of apparatus embodying my invention, and in this figure the glass-gathering receptacle is shown in position to be charged with glass-metal sucked or drawn from the glass-metal-supply chamber. Fig. 2 is a side elevation, largely in section, of a portion of the said apparatus; but in Fig. 2 the glass-gathering receptacle is shown charged and partially closed from below. Fig. 3 is a side elevation, largely in section, of the portion of the apparatus illustrated in Fig. 2; but in Fig. 3 the charged glass-gathering receptacle is shown completely closed from below and hoisted out of the glass-metal-supply chamber. Fig. 4 is a side elevation, partly in section, on line 4 4, Fig. 1, looking in the direction indicated by the arrow placed across the said line; but in Fig. 4 the glass-gathering receptacle is shown swung over a mold to be charged, with the contents of the said receptacle dropping from the receptacle. Fig. 5 is a side elevation in central section of the glass-gathering receptacle and shows the two halves or upright sections of the receptacle separated to facilitate the discharge of the said receptacle. Fig. 6 is a top plan in horizontal section on line 6 6, Fig. 5. Fig. 7 is a top plan in section corresponding with Fig. 6, except that in Fig. 6 the upright halves or sections of the glass-gathering receptacle are shown closed together.

In the accompanying drawings, A designates a melting-furnace which comprises a chamber $a$, in which the molten glass or glass-metal is produced. The chamber $a$ is shown supplied with a body of molten glass or glass-metal G and will hereinafter in this specification be referred to as the "glass-metal-supply" chamber. The chamber $a$ has a top wall B, which is provided with an aperture $b$, large enough in dimensions to accommodate the location and operation of a glass-gathering receptacle D and the cut-off C. The receptacle D is provided centrally of the top thereof with an upwardly-projecting vertically-arranged slide-forming stem $d$, which extends vertically through and has bearing in a correspondingly-arranged slideway-forming box $h$, formed upon the free end of a horizontally-swinging frame H, which is provided at its opposite end with a vertically-arranged journal 10, embracing the upper portion of a correspondingly-arranged standard-forming column E, which is mounted upon and secured to the top of a truck F. The journal 10 rests at the bottom upon a collar $e$, formed upon and externally of the column E. It will be observed, therefore, that the stem $d$ is capable not only of sliding vertically within the box $h$, but also of being swung laterally in a horizontal plane. The stem $d$ is provided near its upper end and externally with a laterally-projecting horizontally-arranged pin or member $d'$, which engages the cam-forming groove $k'$, formed in the cam-wheel $k$, which is operatively mounted upon a horizontal shaft which is arranged longitudinally of the frame and has bearing in a horizontal box with which the said frame at the top is provided, and the trend of the said groove is such that the glass-gathering receptacle D is lowered and hoisted alternately and controlled in its vertical movements. It will be observed also that the receptacle D is suspended from the cam-wheel $k$ through the medium of the engagement of the projecting member $d'$ of the stem $d$ with the groove $k'$ in the cam-wheel $k$, and the box $h$ is slotted vertically, as at $h'$, to accommodate the location of the said member $k'$ during the vertical movements of the said receptacle.

The column E is cylindrical and is hollow, being provided interiorly with a cylindrical bore E', which (see Figs. 1 and 4) extends from end to end of the column and is engaged by a shaft L, which extends vertically through and has lateral bearing in the said column. The column E above the collar $e$ forms the pivotal bearing of the frame H, which, as already indicated, is capable of being swung laterally in a horizontal plane.

Upon the upper end of the shaft L at the upper end of the column E is operatively mounted a bevel-gear L', which meshes with a diametrically-corresponding bevel-gear K', operatively mounted on the cam-shaft K. The shaft L extends a suitable distance below the column and is operatively provided at its lower end with a bevel-gear $l$, which meshes with a diametrically-corresponding bevel-gear $m$, operatively mounted on a shaft M, which is arranged horizontally and supported from the truck F. The shaft M is operatively provided with a spur-gear M', which meshes with a pinion N', operatively mounted on a shaft N, supported from the track and arranged below and horizontally and parallelly with the shaft M. The shaft N is an intermediate shaft, being located between the shaft M and the driving-shaft P, which is supported from the truck F. The shaft N is operatively provided with a spur-gear $n$, which meshes with a pinion $p$, operatively mounted on the driving-shaft P, which is operatively provided with a driving-wheel P', to which power is applied in any approved manner. The upper shaft M is operatively provided with a cam-wheel O, instrumental, as will hereinafter appear, in the swinging of the frame H. The cam-wheel O is provided with a cam-forming groove O', engaged by a pin or member R', formed on and projecting laterally from the lower end of a vertically-arranged slide R, which engages a correspondingly-arranged slideway $f$, with which the truck F is provided adjacent the lower end of the column E. The slide R is operatively connected at its upper end by a link $r$ with a bevel segment-gear $t$, suitably supported from the column E below the journal 10 of the frame H and meshing with a corresponding bevel segment-gear T, formed upon the lower end of the said journal. It will be observed, therefore, that the frame H is swung laterally in the one direction or the other, according as the slide R is actuated in the one or the other direction.

The stem $d$ is tubular or hollow, being provided interiorly with a passage-way 13, which extends longitudinally of the said stem, and communicates at its lower end with the interior chamber 14 of the receptacle D through orifices 15, formed in the top wall of the said chamber and shown very clearly in Figs. 5, 6, and 7.

Means for creating a vacuum or suction within the passage-way 13, and consequently within the chamber 14 of the receptacle D when the said receptacle is in position to be charged with glass-metal at the level of the body of the glass-metal within the glass-metal-supply chamber, as shown in Fig. 1, is provided and comprises a passage-way, which connects the passage-way 13 with the inlet of an air-pump $u$, and is formed by a laterally and horizontally swinging pipe I and a stationary pipe J. The pump $u$ discharges into the external atmosphere. The swinging pipe I is mounted in brackets 16, with which the frame H is provided at the top and above the box 12. The pipe I has depending vertically-arranged end sections 18 and 20, forming opposite ends, respectively, of the said pipe. The pipe-section 18 depends into the stem $d$ and communicates with the passage-way 13, and consequently forms the receiving end of the pipe I. The pipe-section 20 depends into and snugly fits, but is turnable within, the interior chamber $s'$ of a socket $s$, which is arranged in line with and above the shaft L. The socket $s$ is preferably mounted upon a cylindrical post 22, which engages a hole 23, formed in and centrally of the gear L', which rotates around the said post. The post 22 is arranged in line, therefore, with the shaft L. The pipe-section 20 forms the discharging end of the pipe I and discharges into the chamber $s'$ of the socket $s$. The pipe J communicates at one end with the chamber $s'$ and at its other end with the inlet of the pump $u$.

By the construction shown and described it is evident that the pipe I is capable of swinging laterally with the frame H and that upon the operation of the pump $u$ as required to create suction within the connected pipe J suction is also created within the swinging pipe I, and consequently within the receptacle D.

Means for cutting off the contents of the receptacle D from the body of glass-metal G when the said receptacle has been charged is provided and comprises, preferably, a lever 25, which is fulcrumed horizontally, as at 26, at any suitable point between its ends to the lower end of an upright bar W, which is suspended from and pivotally connected with the frame H. The bar W is shown hung at its upper end upon a horizontally-arranged pivot W', which projects laterally and outwardly from the frame H and engages a slot *w*, which is formed in and extends longitudinally of the upper portion of the said bar. The lever 25 is operatively connected with the stem *d*, having one arm thereof pivoted horizontally, as at 27, to the stem in close proximity to the receptacle D. The other arm of the lever 25 forms the cut-off C and is arranged concentrically of the pivot 27, and the lower end of the receptacle D is also shaped concentrically relative to the said pivot to accommodate a proper closing of the receptacle from below by the said cut-off. The pivots W' and 27 and the fulcrum 26 are parallel. The cut-off is provided a suitable distance from its free extremity with a stop-forming lug 28, arranged to engage the receptacle D in the operative position of the cut-off, as shown in Fig. 3 and in dotted lines, Fig. 2, and obviously the slot *w* in the bar W' accommodates the further upward movement of the receptacle D when the cut-off C is in its operative position.

In one position of the frame H the receptacle D is in position to pass vertically through the aperture *b* of the glass-metal-supply chamber, as shown in Figs. 1, 2, and 3, whereas in the other position of the said frame the said receptacle is in position to move vertically over an open mold *x*, mounted upon a truck *y*, which is arranged at one side of the truck F, as shown in Fig. 4—that is, the aperture *b* and the mold *x* are arranged a suitable distance apart laterally below the sweep of the receptacle D.

The receptacle D is preferably expansible laterally, as shown in Figs. 5, 6, and 7, comprising two upright oppositely-arranged sections 30 and 32, shaped to form opposite halves, respectively, of the chamber 14 of the receptacle. The section 30 is rigid with the stem *d*. A horizontally-arranged and horizontally-turnable ring 33 engages a semicylindrical recess 34, formed in the top of the section 30. The space 35 interiorly of the ring 33 communicates at the top with the passage-way 13 in the stem *d* and at the bottom with fine orifices 15 in the top of the sections 30 and 32, which orifices, as already indicated, communicate with the chamber 14 of the receptacle. The section 30 at the bottom of the recess 34 is provided with an upwardly-projecting pin or member 36, which engages a slot 37, formed in the ring 33 and arranged concentrically of the axis of the ring. The engagement of the member 36 with the slot 37 prevents displacement of the ring 33 from the section 30 without interfering with the required limited turnability of the ring. The ring 33 is provided with a laterally-projecting arm 38, which extends over and outwardly from the section 32. Power is applied to the said arm 38 in any approved manner to operate the ring 33. The section 32 is provided on top with an upwardly-projecting pin or member 40, which engages a slot 42, formed in the ring 33 and arranged eccentrically relative to the axis of the ring. The section 32 is provided at the top with two slide-forming parallel and horizontal flanges 43, which are arranged at opposite sides, respectively, of the said section 32 and engage correspondingly-arranged slideway-forming recesses 44, formed in correspondingly-arranged flanges 45, formed on the upper end of the section 30 and arranged at opposite sides, respectively, of the section 32. The section 32 is therefore supported at its flanges 43 from the section 30 and shiftable from the section 30 to expand the receptacle D laterally and laterally enlarge the chamber 14. The trend of the slot 42 and the arrangement of the parts is such that the sections are separated to expand the receptacle D laterally, as shown in Figs. 4, 5, and 6, or, as shown in Fig. 7, closed together, if open, according as the ring 33 is turned in the one or the other direction, and the pin or member 40 engages the one or the other end of the slot 42, according as the sections 30 and 32 have been separated or closed together. All of the orifices 15 communicate, as shown in Fig. 7, with the space 35 in the ring 33, and consequently with the passage-way 13 in the stem *d* when the sections 30 and 32 are closed together; but some of the orifices 15 of the section 32 are obviously covered by the ring 33 in the expanded position of the receptacle D, as shown in Figs. 5 and 6.

The arrangement of the parts, the trend of the cam-forming grooves or ways in the cam-wheels *k* and O, and the timing of the moving parts are as required to accomplish the following: First, the receptacle D—and now suppose that the frame H is in position with the receptacle in line with the aperture *b*—lowers into the chamber *a*, as shown in Fig. 1, to be charged with molten glass; second, the charged receptacle is hoisted, as shown in Fig. 2, and the cut-off C operates to close the charged receptacle from below, as shown in solid and dotted lines, Fig. 3, and, third, the charged receptacle D, when hoisted above the aperture *b*, as shown in Fig. 3, swings to and over the mold *x*, as shown in Fig. 4, and there is lowered into close proximity to the mold, whereupon the receptacle *d* is expanded, as shown in Figs. 4, 5, and 6, to loosen the sections 30 and 32 of the receptacle relative to the contents of the receptacle and to facilitate the deposit of the contents, as shown at *g* in Fig. 4, into the mold, and thereupon the receptacle D is again hoisted and swung back to and lowered into the chamber *a* to be again charged, and the charged mold is replaced by an empty mold to be next charged. The desired level of the body of molten glass or glass-metal G in the chamber *a* is of course maintained, and the said body of glass is kept in the desired molten condition.

What I claim is—

1. In apparatus for feeding glass-metal to molds, the combination, with an inverted cup-shaped receptacle having an upwardly-projecting stem which forms a slide; means for actuating the said receptacle up and down and operatively connected with the aforesaid stem, and a frame provided with a slideway engaged by the aforesaid slide-forming stem; a bar depending and pivotally supported from the said frame at one side of the aforesaid stem; a lever fulcrumed to the lower end of the bar and having one arm thereof pivoted to the aforesaid stem, which lever has its other arm arranged to form a cut-off for closing the receptacle from below, and the arrangement of the parts being such that the cut-off is rendered operative or inoperative according as the receptacle is hoisted or lowered.

2. In apparatus for feeding glass-metal to molds, the combination, with an inverted cup-shaped receptacle, and a frame carrying the receptacle, of a bar depending and pivotally supported from the said frame and having a limited movement vertically; a lever fulcrumed to the bar and having one arm thereof operatively connected with the receptacle, which lever has its other arm arranged to form a cut-off for closing the receptacle from below, which last-mentioned arm is provided, at suitable distance from its free extremity, with a stop arranged to engage the said receptacle in the operative position of the cut-off, and the arrangement of the parts being such that the cut-off is rendered operative or inoperative according as the receptacle is hoisted or lowered.

3. In apparatus for feeding glass-metal to molds, an inverted cup-shaped receptacle having an upwardly-projecting stem which forms a slide; a frame pivotally mounted to render it capable of swinging laterally in a horizontal plane and provided with a slideway engaged by the aforesaid slide-forming stem; means for swinging the said frame laterally; a shaft carried by the said frame and arranged horizontally and longitudinally of the frame, which shaft is operatively provided with a cam-wheel operatively connected with the aforesaid stem, and means for transmitting power to the said shaft.

4. In apparatus for feeding glass-metal to molds, the combination, with an inverted cup-shaped receptacle; a frame carrying the said receptacle and pivotally mounted to render it capable of swinging laterally in a horizontal plane, of a bevel-gear carried by the frame at the bottom of the frame and arranged with its axis coincident with the axis of the frame; another bevel-gear meshing with and supported below the first-mentioned gear; a shaft arranged a suitable distance below the said frame and operatively provided with a cam-wheel; a slide operatively connected with the cam-wheel; a slideway for the said slide, and an operative connection between the said slide and the lower gear.

5. Apparatus for feeding glass to molds, comprising a truck, a column mounted upon the truck and provided externally with a seat; a shaft extending vertically through and having lateral bearing in the column; a driving-shaft intergeared with the said upright shaft at the lower end of the latter; a frame having a vertically-arranged journal embracing the column and resting upon the aforesaid seat; a horizontal shaft arranged longitudinally of and supported from the said frame and intergeared with the aforesaid vertically-arranged shaft at the upper end of the aforesaid journal, which frame is provided, at its free end, with a vertically-arranged slideway; an inverted cup-shaped receptacle having an upwardly-projecting vertically-movable stem which engages the said slideway; an operative connection between the said stem and the aforesaid horizontal shaft; a cut-off for closing the receptacle from below, and means for charging the receptacle.

6. Apparatus for feeding glass to molds, comprising a column provided externally with a seat; a shaft extending vertically through and having lateral bearing in the column; a frame having a vertically-arranged journal embracing the column and resting on the aforesaid seat; a horizontal shaft arranged longitudinally of and supported from the said frame and intergeared with the aforesaid vertically-arranged shaft at the upper end of the aforesaid journal; an inverted cup-shaped receptacle carried by the said frame and having an upwardly-projecting stem which has an interior passage-way extending longitudinally of the stem and communicating with the interior chamber of the receptacle; an operative connection between the said stem and the aforesaid horizontal shaft; a cut-off for closing the receptacle from below; a pipe-line comprising a pipe-section capable of swinging laterally with the lateral movements of the aforesaid frame, which pipe-section is arranged with its axis coincident with the axis of the said frame and is in communication with the aforesaid passage-way, and means for creating suction within the said pipe-line.

In testimony whereof I sign the foregoing specification in the presence of two witnesses.

JONATHAN HALEY.

Witnesses:
C. H. DORER,
G. M. HAYES.